US010659566B1

(12) United States Patent
Luah et al.

(10) Patent No.: US 10,659,566 B1
(45) Date of Patent: May 19, 2020

(54) DEMO RECORDING UTILITY

(71) Applicant: Wells Fargo Bank, N.A., San Francisco, CA (US)

(72) Inventors: Christina Luah, San Francisco, CA (US); Marcus Lee, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 384 days.

(21) Appl. No.: 14/587,693

(22) Filed: Dec. 31, 2014

Related U.S. Application Data (60) Provisional application No. 62/073,640, filed on Oct. 31, 2014.

(51) Int. Cl.
| | | |
|---|---|---|
| *G06F 15/16* | (2006.01) | |
| *H04L 29/06* | (2006.01) | |
| *H04L 29/08* | (2006.01) | |
| *G06F 17/24* | (2006.01) | |
| *G06F 11/34* | (2006.01) | |

(52) U.S. Cl.
CPC .......... *H04L 67/42* (2013.01); *G06F 11/3414* (2013.01); *G06F 17/241* (2013.01); *H04L 67/02* (2013.01)

(58) Field of Classification Search
CPC .. G06F 11/302; G06F 17/30905; G06F 9/542; G06F 9/4411; G06F 11/36; G06F 17/3089; G06F 17/30899; G06F 3/048; G06F 3/04842; G06F 9/50; G06F 11/3414; G06F 11/3668; G06F 11/3688; G06C 30/0601; G09B 25/00; G09B 5/062; G09B 19/0053; G09B 7/00; G11B 27/034; H04L 67/02; H04L 67/2861; H04L 63/104; G06Q 30/0601; G06Q 20/04

USPC .................. 235/375, 454; 434/365; 707/821; 709/219; 382/232

See application file for complete search history.

(56) References Cited

U.S. PATENT DOCUMENTS

| | | | | |
|---|---|---|---|---|
| 6,608,634 B1 * | 8/2003 | Sherrard | ........... | G06F 17/30899 707/E17.119 |
| 7,545,373 B2 * | 6/2009 | Knighton | ........... | G06Q 30/0601 235/454 |
| 7,653,705 B2 * | 1/2010 | Gudipaty | ............. | G11B 27/034 382/232 |
| 7,970,263 B1 * | 6/2011 | Asch | ....................... | G06F 11/302 235/375 |
| 8,386,928 B1 * | 2/2013 | Asch | ................... | G09B 19/0053 715/704 |

(Continued)

*Primary Examiner* — Dustin Nguyen
(74) *Attorney, Agent, or Firm* — Foley & Lardner LLP (57) ABSTRACT

A system includes a data storage system, and a processor and program logic. The program logic includes a management console, including interface logic configured to provide a user interface. The interface logic is also configured to receive a request to record a demo of a Web application via the user interface. The program logic also includes a recording utility. The recording utility includes recording logic configured to, upon receiving the request to record, capture a first instance of underlying client-side code and assets utilized to render the Web application. The program logic further includes data consolidation and storage logic configured to save the first instance to a database. Further yet, the program logic includes demo editing logic configured to create a demo of the Web application based on the first instance.

30 Claims, 9 Drawing Sheets

(56) References Cited

U.S. PATENT DOCUMENTS

| | | | |
|---|---|---|---|
| 8,727,779 B2 | 5/2014 | Eversole et al. | |
| 8,845,337 B1* | 9/2014 | Hu | G09B 25/00 |
| | | | 434/365 |
| 9,064,424 B2* | 6/2015 | Cooperman | G09B 5/062 |
| 9,098,333 B1* | 8/2015 | Obrecht | G06F 9/50 |
| 9,418,172 B2* | 8/2016 | White | G06F 17/30905 |
| 10,108,584 B2* | 10/2018 | Song | G06F 3/1256 |
| 2004/0003345 A1* | 1/2004 | Brown | G06F 17/30899 |
| | | | 715/205 |
| 2004/0111727 A1* | 6/2004 | Schwarzbauer | G06F 11/36 |
| | | | 719/310 |
| 2004/0172253 A1* | 9/2004 | Singh | G06F 11/3414 |
| | | | 704/270.1 |
| 2006/0101404 A1* | 5/2006 | Popp | G06F 11/3688 |
| | | | 717/124 |
| 2008/0120406 A1* | 5/2008 | Ahmed | G06F 11/3414 |
| | | | 709/224 |
| 2009/0083710 A1 | 3/2009 | Best et al. | |
| 2009/0089404 A1* | 4/2009 | Guo | H04L 67/02 |
| | | | 709/219 |
| 2009/0209350 A1* | 8/2009 | Kelly | G06Q 20/04 |
| | | | 463/42 |
| 2009/0248695 A1* | 10/2009 | Ozzie | H04L 67/2861 |
| 2011/0173239 A1* | 7/2011 | Sayed | G06F 9/542 |
| | | | 707/821 |
| 2011/0246879 A1* | 10/2011 | White | G06F 17/3089 |
| | | | 715/704 |
| 2012/0023407 A1* | 1/2012 | Taylor | G06F 3/04842 |
| | | | 715/731 |
| 2012/0204091 A1* | 8/2012 | Sullivan | G06F 11/3664 |
| | | | 715/234 |
| 2012/0204102 A1 | 8/2012 | Gwin et al. | |
| 2013/0007622 A1 | 1/2013 | Ke et al. | |
| 2015/0033297 A1* | 1/2015 | Sanso | H04L 63/104 |
| | | | 726/5 |
| 2015/0037781 A1* | 2/2015 | Breed | G09B 7/00 |
| | | | 434/362 |
| 2016/0110322 A1* | 4/2016 | Miller | G06F 3/048 |
| | | | 715/758 |
| 2016/0269509 A1* | 9/2016 | Dooley | G06F 9/4411 |

* cited by examiner

DEMO RECORDING UTILITY

CROSS-REFERENCE TO RELATED PATENT APPLICATIONS

The present application claims priority to U.S. Provisional Application No. 62/073,640, titled "DEMO RECORDING TOOL" filed Oct. 31, 2014, the entirety of which is herein incorporated by reference.

BACKGROUND

Software demonstration, or "demo" versions are developed for various reasons, such as to showcase functionality of the software to prospective clients, to provide service and support features, and to train individuals on using the software, for example. Often, software demos have limited functionality and interactability compared to full versions of the software. For example, certain software demos are multimedia-based, including videos or slideshows to demonstrate the software functionality. Other software demos may include stripped-down versions in which certain functionality is unavailable.

A Web application is a type of software that is developed using a browser-supported programming language (e.g., JavaScript, HTML, CSS, etc.) and relies on a Web browser in communication with a server over a network to render the application. Software tools are increasingly developed as Web applications because of the ubiquity of Web browsers and the convenience of using a Web browser as a client (e.g., a thin client), among other reasons. Because Web applications operate over a network (e.g., the Internet), a reliable network connection is required to demonstrate Web applications' functionality. Therefore, in certain situations, it is desirable to develop a demo version of a Web application that is capable of operating offline, that is, without a network connection.

SUMMARY

One embodiment relates to a system including a data storage system, and a processor and program logic stored in memory and executed by the processor. The program logic includes a management console that includes interface logic configured to provide a user interface. The interface logic is also configured to receive a request to capture an instance of the underlying code of a Web application via the user interface. The program logic also includes a recording utility. The recording utility includes recording logic configured to, upon receiving the request to record, capture a first instance of underlying client-side code and assets utilized to render the Web application. The program logic further includes data consolidation and storage logic configured to save the first instance to a database. Further yet, the program logic includes demo editing logic configured to create a demo of the Web application based on the first instance of the underlying code and assets.

Another embodiment relates to a demo recording utility comprising of a processor coupled to non-transitory machine readable storage media having instructions stored therein. The instructions, when executed by the processor, cause the processor to capture, through a proxy configuration, a first instance of underlying client-side code and assets utilized to render the Web application. The instructions, when executed, also cause the processor to save the first instance to a database. The instructions further cause the processor to create a demo of the Web application based on the first instance.

DETAILED DESCRIPTION

Developing offline demos for Web applications is inherently difficult due to Web applications' functional architecture. In particular, Web applications, such as Rich Internet Applications (RIAs), typically include both client-side scripting and server-side scripting. Web applications provide a dynamic and interactive user experience by updating content via the client-side scripting and the server-side scripting in response to various contexts or conditions. For example, client-side scripting may be used to change interface behaviors within a displayed page in response to a user input (e.g., a mouse or keyboard input). In addition, server-side scripting may be used to change the supplied page source between pages based on various conditions. Therefore, developing an offline demo of a Web application requires capturing functionality associated with both client-side logic and server-side data.

Various methods and systems have been utilized to create offline demos of Web applications. For example, certain offline demos of Web applications have been created utilizing tools that operate by capturing multimedia (e.g., screenshots or video) from a Web application (e.g., Adobe Captivate™). Although such demos are relatively simple to develop, they pose several major disadvantages. For example, such demos have limited interactivity because they capture only a single flow or a series of flows of interacting with the Web application. In addition, it is not possible to enhance such demos based on particular features or components, nor is it possible to add or remove operational flows. These challenges make it difficult to quickly accommodate for new or changing features in dynamic Web applications. Further, because only a single user flow or series of user flows and interaction is captured, these demos may demonstrate only a small percentage of a Web application's overall functionality. Thus, demos created using such tools are only able to cover a limited number of scenarios or use cases. Further yet, such demos may not be fully compliant with Section 508 of the Americans with Disabilities Act (ADA), which specifies functionality for users who have visual or hearing impairments, mobility impairments, or other types of disabilities. Therefore, multimedia-based (e.g., screenshot-based and video-based) demos may be undesirable in many situations.

As another example, certain offline demos of Web applications have been created utilizing hybrid development tools that leverage wireframing and rapid prototyping technologies to integrate product development and demo development (e.g., iRise™). Demos created using these techniques are more interactive than multimedia-based demos. However, wireframing tools also pose difficulties in creating demos that are fully ADA compliant. In addition, developing the widgets that development tools such as iRise™ requires may involve significant development time (e.g., multiple quarters or even years). Moreover, in order to emulate the underlying Web application behavior, one cannot reuse the original Web application code and must redefine component interaction behavior, which requires rewriting instances of code and rewriting functionality. Some wireframing tools may have certain pre-defined components (e.g., selection boxes or search functions); however, pre-defined components may not interact in the same way as in a particular Web application, resulting in a dissociative experience between the demo and the actual Web application features, which can be misrepresentative of the true Web application functionality. Further, developing demos using wireframing tools is inefficient and error-prone, due to the manual interaction and coding that is required. Therefore, wireframing tools may also be undesirable in many situations.

As a further example, other offline demos of Web applications have been created utilizing software tools configured to store Webserver logs. For example, Customer Experience Management (CEM) tools (e.g., Tealeaf™) are designed for this purpose. CEM tools typically operate by capturing and storing Webserver logs for later analysis and session replay. However, many Web applications (e.g., RIAs) produce a significant amount of client-side code-based interaction that is not communicated through the Webserver and, therefore, the user's behavior is not captured by such CEM tools. Furthermore, in some instances, certain encrypted objects may not be completely captured using such tools. Therefore, such demos may not capture the full functionality of the Web application.

As a still further example, other offline demos of Web applications have been developed substantially manually by dedicated demo development teams. However, such development is extremely cumbersome, tedious, and inefficient. In order to develop demos in this way, developers manually interact with a Web application for which the demo is being created, based on demo specifications provided by a particular business, quality assurance, or training unit. Upon performing a discrete interaction with the Web application (e.g., a mouse or keyboard input), the developer manually views the source code, copies the source code for that instance, and pastes the source code onto a separate demo development instance. The developer must also download and save any images, JavaScript, and other assets associated with the Web application at that instance. The developer repeats this procedure for each discrete instance of the Web application delineated in the specification. The developer must then manually edit the source code and assets to enable the demo to run locally as an offline demo. Although demos developed in this manner may be functional, interactive, and ADA compliant, they are extremely expensive and time-consuming due to the amount of manual work required. Further, each individual step performed by the developer provides a potential opportunity for the developer to make an error or mistake.

In general, embodiments of the present disclosure relate to a demo recording utility for developing both online and offline demos of Web applications. According to an embodiment, the demo recording utility is configured to capture underlying browser requests, client side code, and underlying assets used to render the Web application as they are being passed through a proxy during user interaction with the Web application. Therefore, the demo recording utility captures the underlying functionality and interactivity of the Web application, including its ADA compliant features. In addition, the demo recording utility automates, to a significant extent, offline Web application demo development, thereby reducing cost and development time.

In addition, the demo recording utility described herein provides enhanced functionality with respect to maintaining, updating, and enhancing demos. Because the demo recording utility operates by capturing various instances of the underlying code and assets used to render a Web application, entire instances of the underlying code need not be recreated in order to maintain or update functionality of a demo. Instead of rewriting entire instances of code, a developer may create a demo using the demo recording utility to capture the underlying code and assets by simply interacting with various components of a Web application.

Further, the demo recording utility includes extensive post-processing functionality, as well as functionality to add demo banner copy and navigation features. For example, in an embodiment, the demo recording utility includes link management logic to modify links to connect pages throughout user flows within the captured data to be fully functional both online and offline. The demo recording utility also includes data management logic to "scrub" configurable data sets and to replace the configurable data sets with user-specified data sets. This feature allows for data set replacement based on defined target data set parameters on a global level (e.g., applied to all demos created using the demo recording utility) or on a per-demo level (e.g., applied to one or more particular demos created using the demo recording utility). The demo recording utility further includes banner copy logic to provide navigation features and optional content within the demo and to export final versions of demos.

The demo recording utility may be used to create demos to support a number of devices and platforms. For example, demos can be made available for online access to a PC, tablet or smart phone. Demo files can also be exported to be made to run offline as a local package on a PC or as an application on a tablet or smartphone without requiring network dependency.

Figure 1:
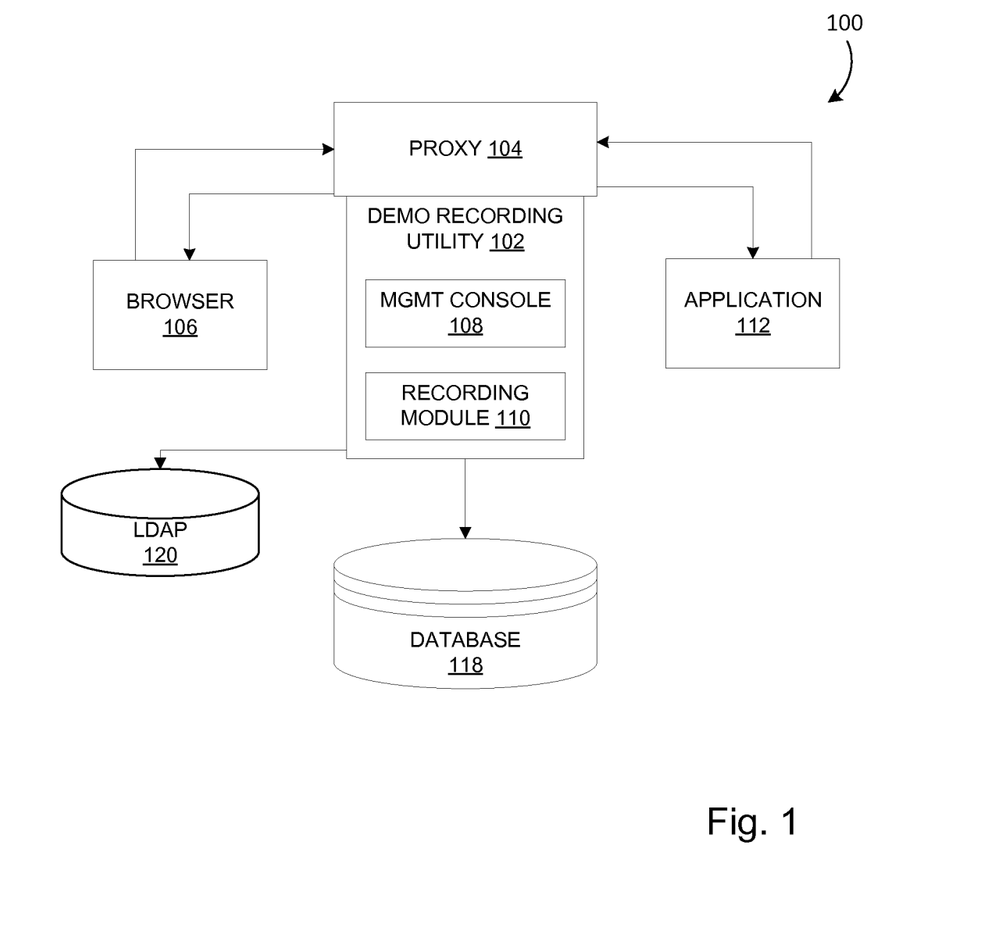
FIG. 1 is a block diagram of a demo creation framework including a demo recording utility, according to an embodiment.

Turning to FIG. 1, a block diagram of a demo creation framework 100 including a demo recording utility 102 is illustrated, according to an embodiment. The demo recording utility 102 includes various functionality to develop functional and interactive online and offline demos of Web applications. As shown in FIG. 1, the demo recording utility 102 communicates through a proxy 104 and is accessed by a user through a browser 106. The demo recording utility 102 may be described as having two primary components, a management console 108 and a recording module 110. The management console 108 provides a user interface and administrative functionality for recording and editing demos. For example, a user may access the demo recording utility 102 by configuring the proxy settings of the browser 106 to specific proxy 104 settings so as to engage the demo recording utility 102, and then logging into the management console 108 of the demo recording utility 102 through the browser 106. In some embodiments, the demo recording utility 102 is manifested through integrated drive electronics (IDE), installable software, etc. In such embodiments, the demo recording utility 102 may be accessed by a user through a browser plug-in or in other ways.

Upon setting the proxy settings, the user may initiate recording of a demo of a Web application 112. The recording module 110 is configured to capture all of the user requests received from the browser 106, as well as all of the client-side code generated by the Web application received through the proxy 104 and rendered by the browser 106 as the user interacts with the Web application 112 through the browser 106. The recording module 110 is configured to save the captured information into a database 118 (e.g., a SQL database) as a separate instance. The information captured by the recording module 110 and saved into the database 118 may further include any asset associated with the application 112, including code (e.g., HTML, JavaScript, CSS, etc.), code libraries (e.g., JavaScript and CSS libraries), images, PDF files, etc. The information captured by the recording module 110 and saved into the database 118, including all of the assets associated with the application 112, may later be extracted and post-processed so as to generate either an online or offline demo of the application 112. In addition, user authentication and authorization may be managed using a Lightweight Directory Access Protocol (LDAP) directory 120.

Because the demo recording utility 102 captures all of the client-side code, including all of the user requests to the browser 106, the responses from the Web application 112, and all of the assets associated with the application 112, the demo recording utility 102 is capable of generating a fully-interactive demo, regardless of the underlying development tools used to build the application 112. Therefore, the demo recording utility 102 provides superior demo creation capabilities than conventional tools, such as those that operate by capturing and storing Webserver logs. In particular, the demo recording utility 102 is capable of creating demos for various types of Web applications 112 and retain client-side-based interactive features, such as in the case of RIAs, which utilize client-side code that is not captured by conventional log-based tools. Because the demo recording utility 102 captures code in this manner, the demo recording utility 102 provides superior demo creation functionality compared to conventional tools and procedures used to create software demos.

In an aspect, demos created by the demo recording utility 102 may be thought of as functional "mini versions" of the application 112 that include all of the functionality of the application 112 itself, according to the user's interaction therewith during the recording of the demo. Moreover, because the recording module 110 captures code for both client-side features and server-side response as the code is being passed from the Web application 112 through the proxy 104 to the browser 106, components on a page that are not explicitly interacted with by the user during the session will also be captured. Thus, the captured components (e.g., a calendar icon/widget, sorting and/or filtering for a table, shuttle controls, etc.) retain their full functionality in the demo. For example, for a complex page including multiple date selections, extensive options in a drop down menu, a robust table with sort and filter logic, and shuttle selection, a developer utilizing the demo recording utility 102 would need only to access the page to capture each of these complex features. Therefore, a user (e.g., a customer or trainee) may fully and completely interact with the demo, or "mini version," of the application offline and experience same functionality of the application 112 as that experienced by the user during the recording of the demo.

Figure 2:
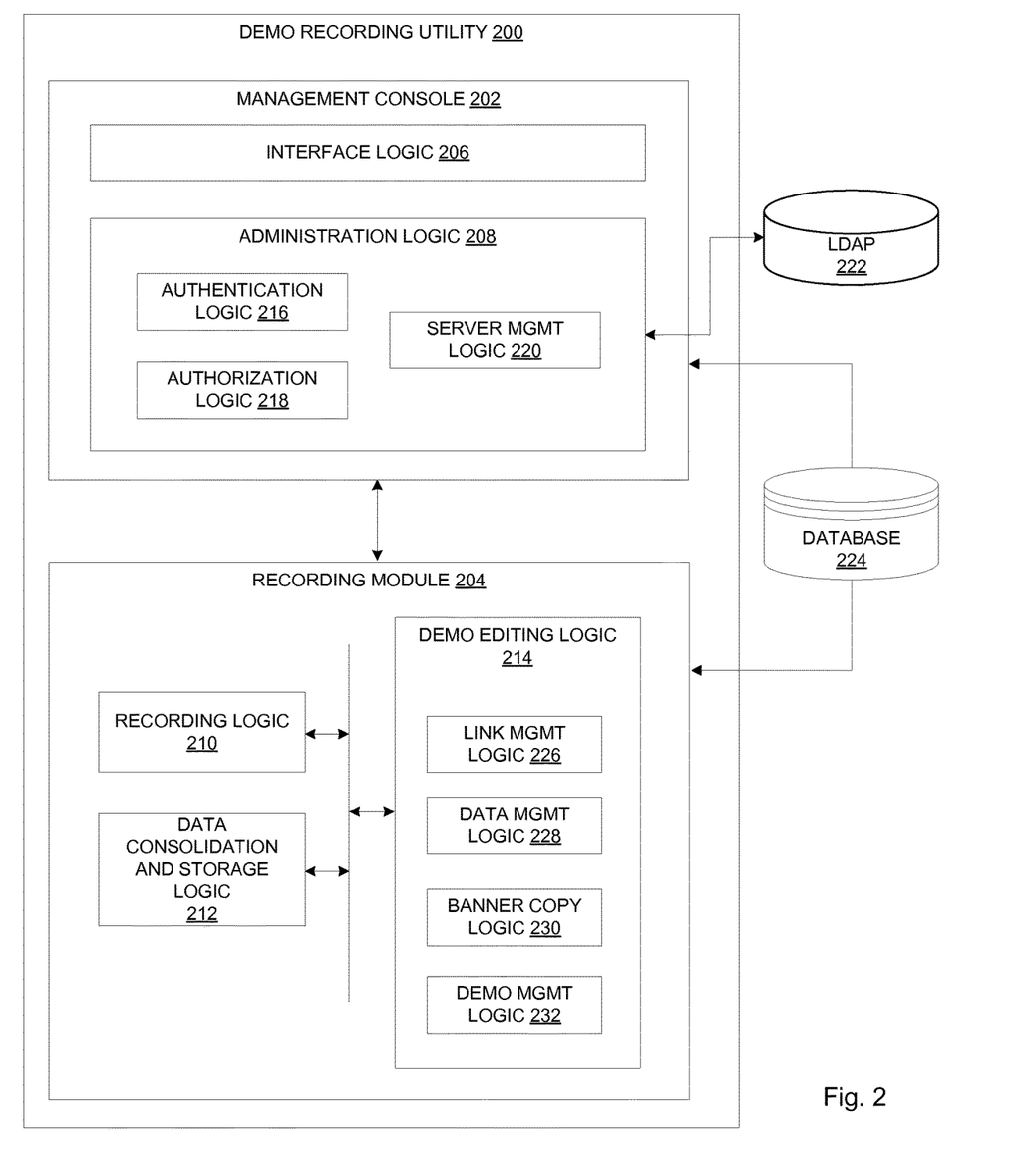
FIG. 2 is a block diagram of a demo recording utility including a management console and a recording module, according to an embodiment.

Turning to FIG. 2, a block diagram of a demo recording utility 200 including a management console 202 and a recording module 204 is illustrated, according to an embodiment. The demo recording utility 200, including the management console 202 and the recording module 204 may, but need not, be the same as or similar to the demo recording utility 102, including the management console 108 and the recording module 110 as described in connection with FIG. 1. According to an embodiment, the management console 202 may include, among other logics, interface logic 206 and administration logic 208. The recording module 204 may include, among other logics, recording logic 210, data consolidation and storage logic 212, and demo editing logic 214. Such logics and other logics discussed herein may, in practice, be implemented in a machine (e.g., one or more computers or servers) comprising machine-readable storage media (e.g., cache, memory, internal or external hard drive or in a cloud computing environment) having instructions stored therein which are executed by the machine to perform the operations described herein. For example, the demo recording utility 200 may include server-based computing systems, for example, comprising one or more networked computer servers that are programmed to perform the operations described herein. In another example, the demo recording utility 200 may be implemented as a distributed computer system where each function is spread over multiple computer systems.

The interface logic 206 provides a user interface through which a user accesses and operates the demo recording utility 200. As described in connection with the demo recording utility 102 of FIG. 1, the demo recording utility 200 is accessed through a proxy and may be accessed by a user through a browser. According to an embodiment, the interface logic 206 is configured to receive inputs regarding various settings associated with a demo, such as selections of products (e.g., Web applications) to record, server setting configurations, filename specifications, etc. In addition, the interface logic 206 includes control functionality, for example, to start and stop a recording session.

According to an embodiment, the interface logic 206 is also configured to manage the items that are displayed on the various screens of the management console 202. For example, the interface logic 206 may control the displayed items based on the administration logic 208 and the authentication logic 216 accessing credentials from LDAP 222 in combination with the authorization logic 218 for a specific user. Access to features within demo editing logic 214 and the corresponding pages may be driven by a users' role as defined in the authorization logic 218. As another example, a landing screen of the management console 202 may include a list of transactions. After a new transaction is created, the interface logic 206 may update the list to include the new transaction. The interface logic 206 may also control ways in which various file names are displayed.

The administration logic 208 includes various systems and logics to facilitate administrative functionality, including authentication logic 216, authorization logic 218, and server management logic 220. The authentication logic 216 is configured to manage login functionality of the demo recording utility 200. According to an embodiment, a user whitelist is maintained on an LDAP directory 222. The authentication logic 216 is configured to receive login credentials from a user and to cross-reference the login credentials with the user whitelist to authenticate that the user is approved to access the functionally of the demo recording utility 200. If the user is not authenticated, the management console 202 reverts to the login screen and the user is presented with a corresponding error message. Alternatively, if the user is authenticated, the user is directed to a landing page of the management console 202.

The authorization logic 218 is configured to manage users' access to various application features. According to an embodiment, upon the user logging in and being authenticated, the authorization logic 218 determines the user's level of authorization. In some embodiments, authorization is managed by the use of user groups. The accessibility of certain applications and servers, for example, may depend on authorization parameters of the user group with which the user is associated. In some examples, the authorization logic 218 cross-references a server whitelist that specifies certain servers to which various users have access (e.g., based on the users' groups). In addition, the functionality of certain features of the demo recording utility 200 may also depend on authorization parameters of the user group with which the user is associated. In some embodiments, the particular landing page that the user is directed to upon being authenticated depends on the user's authorization group.

For example, according to an embodiment, users may be assigned to user groups such as recording users, editing users, and administrators. A recording user may have access to the recording logic 210 in order to record demos of applications, an editing user may have access to the demo editing logic 214 to edit a captured demo recording, and an administrator may have access to functionality available to recording and editing users, as well as the administration logic 208. Administrators may also be afforded access to additional functionality, such as the ability to edit user and server whitelists.

In some embodiments, the authentication logic 216 and the authorization logic 218 utilize SiteMinder™ to provide policy-based authentication and single sign-on functionality for Web-based applications across an enterprise, IdentityMinder™ to manage detailed user profiles, and TransactionMinder™ to provide access to Web services.

The recording logic 210 of the recording module 204 is configured to capture all of the underlying browser requests, the Web application code, and all underlying assets as they are being passed through the proxy, while the user has controlled the demo recording utility 200 to "record" via the interface logic 206 of the management console 202. As explained above in connection with FIG. 1, the user must first configure the proxy settings of the user's browser to specific proxy settings so as to engage the recording module 204 via the proxy.

The recording logic 210 is also configured to detect and manage session anomalies. For example, in an embodiment, the recording logic 210 is configured to invalidate a user session and any recorded data if the user is inactive for a predetermined time period or if the user closes the browser during a recording session. According to an embodiment, the recording logic 210 is further configured to avoid data overlap between recordings by creating new folders and subfolders to store each new application recording, and each new version of an existing application recording.

The data consolidation and storage logic 212 is configured to combine, compress, and save data in the database 224. Further, the data consolidation and storage logic 212 is utilized to retrieve data from the database 224 and to extract the data. For example, data may be retrieved from the database 224 according to various identifying labels, such as file name, user ID, application number, version, etc. The data consolidation and storage logic 212 may also be configured to map filenames from real filenames in a recorded application to user-friendly filenames.

The demo editing logic 214 of the recording module 204 is configured to facilitate various post-processing events to create a final demo from the information captured by the recording logic 210. The demo editing logic includes link management logic 226, data management logic 228, and banner copy and navigation logic 230 and demo management logic 232.

The link management logic 226 is configured to modify links within the captured data to enable the links including navigation throughout user flows to be fully functional both online and offline. For example, according to an embodiment, the link management logic 226 is configured to convert absolute and relative link paths inside the captured files (e.g., HTML and JavaScript files) to appropriately structured relative link paths. For example, the link management logic 226 may be configured to identify basic links (e.g., <a href=>tags) within HTML and identify whether the relevant files exist in the recording. Based on this, the link management logic 226 may disable hyperlinks if the user selects to do so. Further yet, the link management logic 226 may be configured to obfuscate server names and maintain mappings across recordings. In an embodiment, the link management logic 226 executes on an entire recording and does not allow a user to exclude specific files or lines.

The data management logic 228 is configured to post-process (e.g., "massage") the recorded data. According to an embodiment, the data management logic 228 includes data scrubbing functionality to ensure consistency and privacy between and within demos. For example, data scrubbing may be used to employ particular data sets (e.g., predetermined test data sets including particular user names, account numbers, addresses, etc.) to be referenced by the demo. In some embodiments, the data management logic 228 includes pattern matching functionality, including find and replace instructions. For example, an "account number masking" feature may be configured to search for patterns including ten digits, and to replace the last six digits with "xxxxxx." Such operations may be applied in individual instances, across a particular recording file, or across multiple recording files.

For example, the data management logic 228 may apply defined target data set parameters that specify, for example, phone numbers formatted as XXX-XXX-XXXX or (XXX) XXX-XXXX (e.g., 415-555-9304 or (415) 555-9304) to be replaced with a user-specified phone number data set (e.g., 888-XXX-XXXX). As another example, the defined target data set parameters may define date references formatted as MM/DD/YYYY to be replaced with a user-specified date reference data set (e.g., specific 02/27/20XX or non-specific MM/DD/20XX values).

The banner copy logic 230 is configured to provide navigation and annotation functionality to demos. For example, the banner copy logic 230 may allow a user to add navigation features, such as "previous" and "next" buttons, home screen buttons, expand/collapse buttons, other relevant content for the page, etc. This flexibility enables the demos to include additional features in addition to the features that are available in the Web application itself. Essentially, the banner copy logic 230 provides the ability to build on top of an application's functionality to navigate a user through the user's interaction with the application. Navigation improves usability by users who may be unfamiliar with a complex application and may not know how to interact with a page to move along within a transaction flow. In addition, in the absence of a browser (e.g., as with a native application) or in the event of an ill-designed Web application, navigation allows the user to easily return to the landing screen of the demo or the previous or next page of the demo. Various types of content may be used as help text to guide the user through a demo (e.g., sales text to highlight key features and benefits of the application).

The demo management logic 232 is configured to manage demos created by the demo recording utility 200. For example, according to an embodiment, the demo management logic 232 is configured to list the demos that have been created by the demo recording utility 200. The demo management logic 232 may also control demo versioning. For example, the demo management logic 232 may list all of the versions that have been created for a particular demo. Further, the demo management logic 232 allows administrators to enable or disable particular versions. The demo management logic 232 is also configured to identify changes and to provide the ability to merge file sets between different versions of an application demo.

Figure 3:
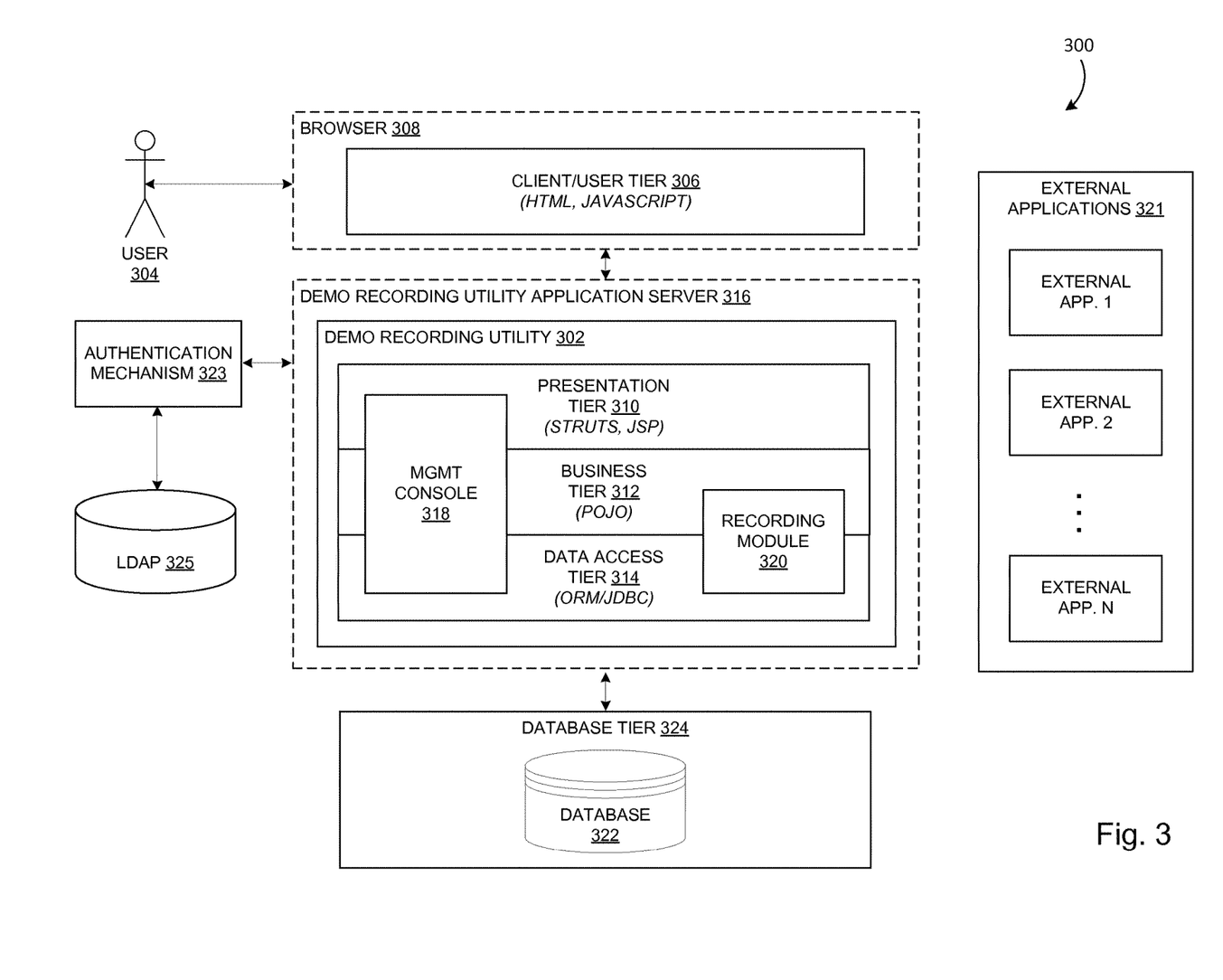
FIG. 3 is a schematic diagram illustrating an overall demo recording system architecture including a demo recording utility, according to an embodiment.

FIG. 3 is a schematic diagram illustrating an overall architecture of a demo recording system 300, including a demo recording utility 302, according to an embodiment. The demo recording utility 302 is accessed by a user 304 through a client tier 306 via a browser 308. The user accesses the demo recording utility 302 by configuring the proxy in the browser 308. According to an embodiment, the browser 308 is a Web browser (e.g., Chrome™, Safari™, Firefox™, Internet Explorer™, etc.) that is accessed via a computer (e.g., a desktop, laptop, tablet, mobile telephone, etc.). The client tier 306 employs client-side scripting, such as HTML and JavaScript.

The demo recording utility 302 also includes a presentation tier 310, a business tier 312, and a data access tier 314. Each of the presentation, business, and data access tiers 310, 312, 314 runs on a Webserver 316. The demo recording utility 302 may be described as having two primary components, a management console 318 and a recording module 320. The management console 318 provides various administrative functions for recording demos of one or more external Web applications 321. The recording module 320 is accessed through the management console 318. The recording module 320 is configured to record demos by capturing actions of the user 304 when the proxy is configured in the browser 308, and to save the contents to a database 322 within a database tier 324.

The presentation tier 310 houses the management console 318. According to an embodiment, the presentation tier 310 utilizes a standard model-view-controller (MVC) design pattern implemented using Struts, as well as JavaServer Pages (JSP) technology to develop the user interfaces (UIs) of the management console 318.).

The business tier 312 is common for both of the management console 318 and the recording module 320. According to an embodiment, the business tier 312 holds business logic of the demo recording utility 302, and is developed using Plain Old Java Objects (POJOs). There are several advantages to utilizing POJO, including, for example, (1) reducing the technology overhead in the business tier 312; (2) simplifying development of the business tier 312; (3) ensuring that the business tier 312 is light and easy to implement; and (4) improving the performance of the business tier 312, as inter-tier and intra-tier calls are local calls because the management console 318 and the recording module 320 reside within the same JVM.

According to an embodiment, the management console 318 includes business logic relating to, for example, authorization, navigation management, link management, data management (e.g., data scrubbing, AJAX processing, banner copy management, etc.), recording versions management, and packaging. For example, in an embodiment, the management console 318 authenticates and authorizes the user 304 through an authentication mechanism 323, which cross-references login credentials received from the user 304 with an LDAP database 325. In addition, according to an embodiment, the recording module 320 includes business logic relating to, for example, recording, massaging the recorded data, recording all resources to the database 322 for each logged-in user and the application the user(s) are planning to record, compressing and saving the recorded data to the database, session management, and single sign-on.

The data access tier 314 is also common for both of the management console 318 and the recording module 320. According to an embodiment, the data access tier 314 is configured to operate as a gatekeeper between the business tier 312 and the database tier 324 to effectuate separation of duties between the respective tiers. According to an embodiment, the data access tier 314 is implemented using low-level design technology, such as Hibernate or Java Database Connectivity (JDBC).

The database tier 324 including the database 322 is configured to store all of the information captured by the recording module 320, as well as information (e.g., configuration information) from the management console 318.

FIGS. 4A-F illustrate a user interface 400 of a management console of the demo recording utility, according to various embodiments. The user interface 400 may be implemented by the management consoles 108, 202, 318 of FIGS. 1-3.

Figure 4A:
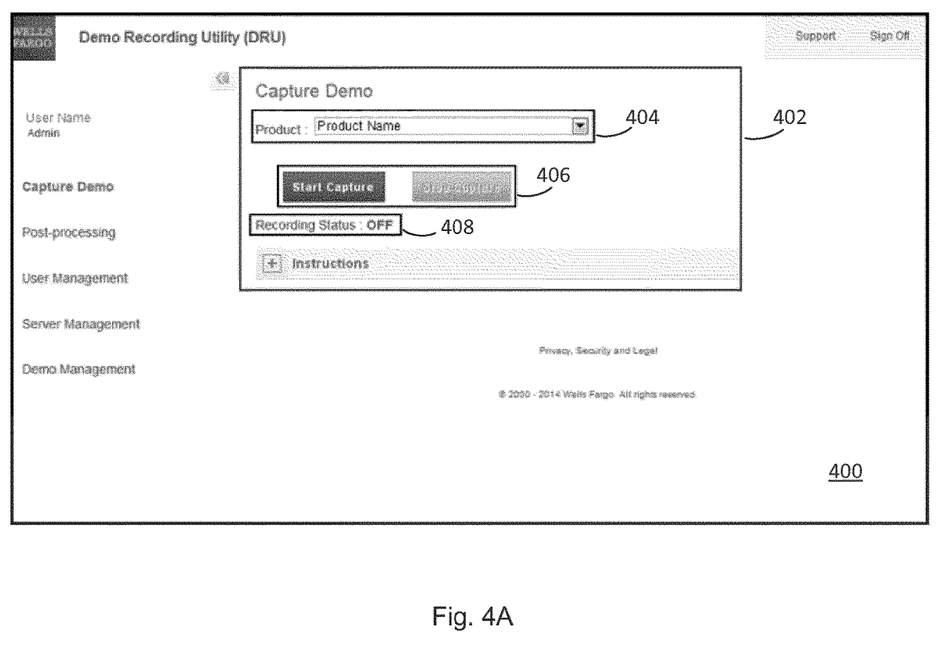
FIGS. 4A-F illustrate a user interface of a management console of a demo recording utility, according to various embodiments.

Turning to FIG. 4A, a Capture Demo screen 402 of the user interface 400 is illustrated, according to an embodiment. According to an embodiment, the Capture Demo screen 402 leverages the recording logic 210 of FIG. 2. The Capture Demo screen 402 may be utilized to initiate and conclude a capture session to capture client-side application code for the creation of a demo of a particular product (e.g., a particular Web application). As shown in FIG. 4A, Capture Demo screen 402 includes a product selection menu 404 to select a particular product for which a demo is to be created and/or edited. The Capture Demo screen 402 also includes start and stop buttons 406 to begin and end a recording session. In addition, the Capture Demo screen 402 includes a recording status 408 that indicates whether or not a capture session is in progress.

Figure 4B:
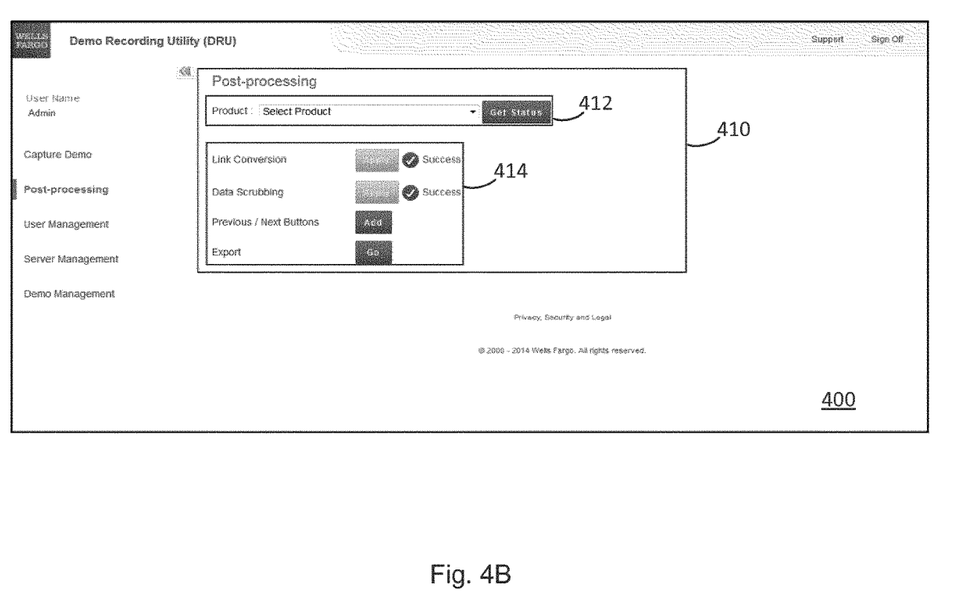

FIG. 4B illustrates a Post-processing screen 410 of the user interface 400, according to an embodiment. As shown in FIG. 4B, the Post-processing screen 410 includes a product selection menu 412 to select a particular product for which a demo (e.g., the most recent demo version) is to be edited. According to an embodiment, the Post-processing screen 410 leverages the demo editing logic 214 of FIG. 2. The Post-processing screen 410 includes post-processing functions 414 that may be performed on a selected demo. For example, the post-processing functions 414 may include link conversion, data scrubbing, and banner copy functionality (e.g., to provide demo navigation and other relevant content), and demo export functionality. In an embodiment, the post-processing functions 414 may automatically display a status of certain functions when a product is selected in the product selection menu 412 and the user selects "Get Status." For example, as illustrated in FIG. 4B, the link conversion and data scrubbing post-processing functions 414 are identified as "Success," meaning that the corresponding functions have been successfully performed.

Figure 4C:
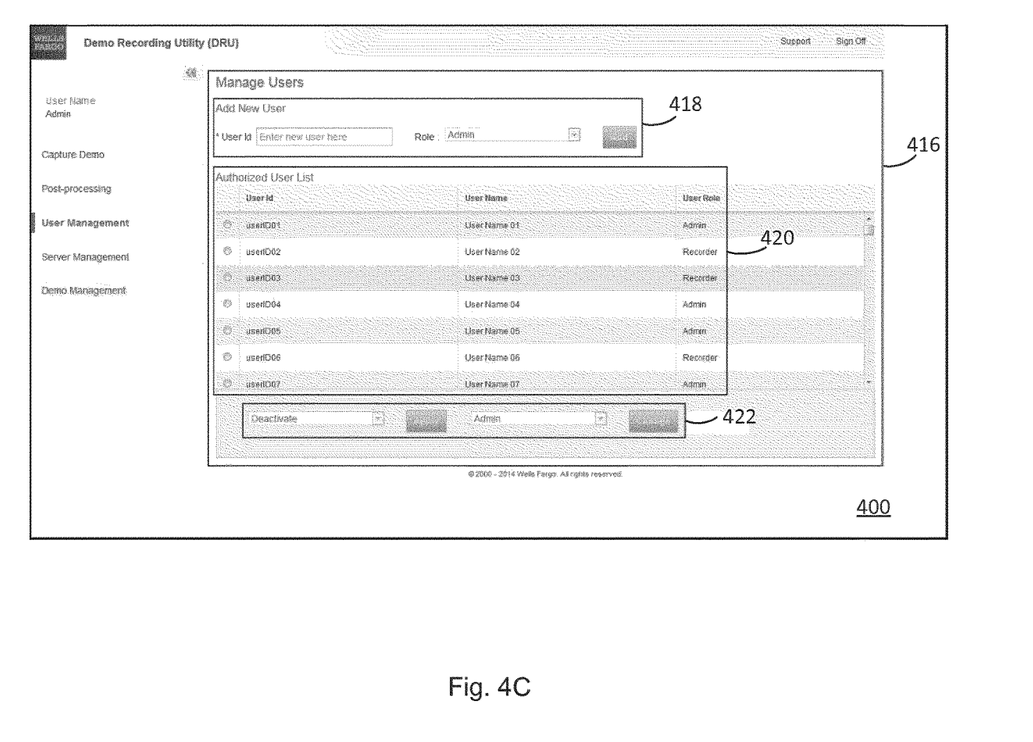

FIG. 4C illustrates a Manage Users screen 416 of the user interface 400, according to an embodiment. According to an embodiment, the Manage Users screen 416 leverages the administration logic 208 of FIG. 2, including the authentication logic 216 and the authorization logic 218. According to an embodiment, only those users who are classified as administrators may access the Manage Users screen 416. As illustrated in FIG. 4C, the Manage Users screen 416 includes an Add New Users module 418 through which new users may be added and assigned a role. The Manage Users Screen 416 also includes an Authorized User List 420 that lists current users by their user ID and user name, and also lists each user's respective role. The Manage Users Screen 416 further includes a role editing module 422 to manage users in the Authorized User List 420. For example, the role editing module 422 allows a user selected in the Authorized User List 420 to edit user permissions including activating and deactivating users, and changing users' roles. As discussed above in connection with the authorization logic 218 of FIG. 2, a user's authorization status may dictate the user's access to various functions as designated by their role. In some embodiments, a user's authorization is managed by a user group or role to which the user is assigned.

Figure 4D:
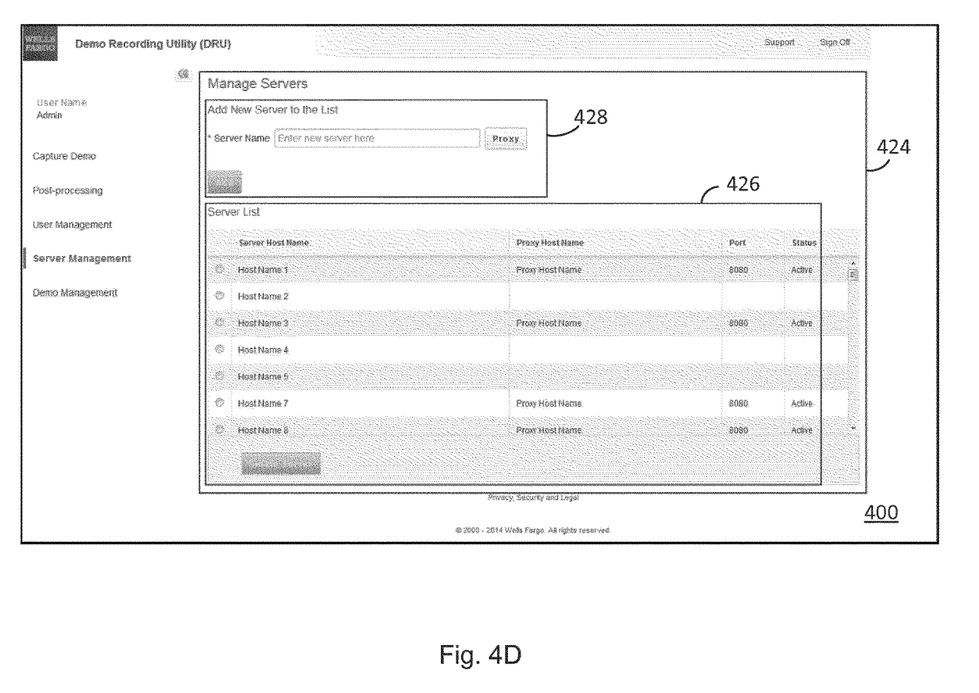

FIG. 4D illustrates a Manage Servers screen 424 of the user interface 400, according to an embodiment. According to an embodiment, the Manage Servers screen 424 leverages the server management logic 220 of the administration logic 208 as depicted in FIG. 2. According to an embodiment, the Manage Servers screen 424 includes a Server List 426, which a user (e.g., an administrator) may control to manage the domains accessible by the demo recording utility. For example, the Server List 426 may allow an administrator to select a domain to be deleted or to add a server to the list via an add server component 428.

Figure 4E:
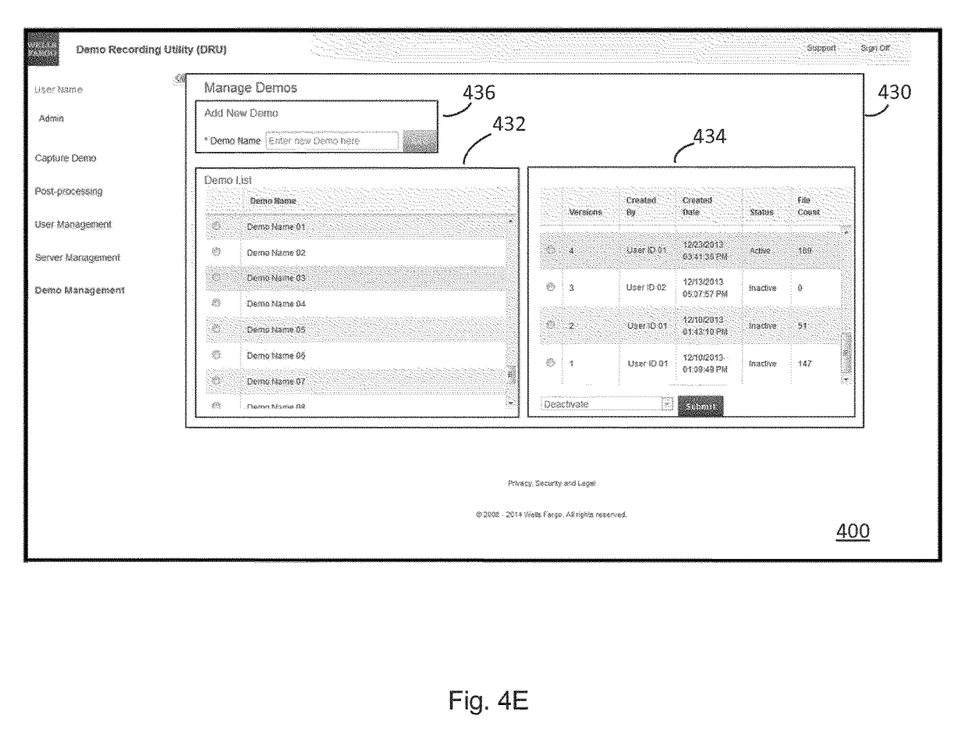

FIG. 4E illustrates a Manage Demos screen 430 of the user interface 400, according to an embodiment. According to an embodiment, the Manage Demos screen 430 leverages the demo management logic 232 of FIG. 2. The Manage Demos screen 430 includes a Demo List 432; a version list 434, which versioning information corresponding to the demo selected within the Demo List 432; and an Add New Demo component 436. According to an embodiment, a user may select a demo from the Demo List 432 and enable or disable various versions via the version list 434.

Figure 4F:
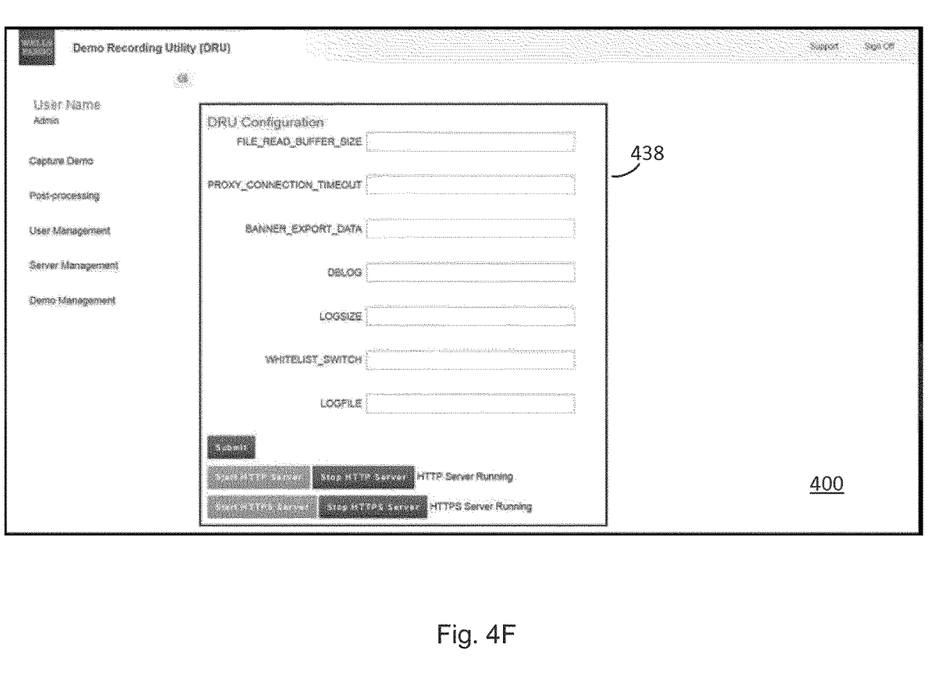

FIG. 4F illustrates a Demo Recording Utility (DRU) Configuration Screen 438. According to an embodiment, the DRU Configuration Screen 438 allows development administration users to set certain configuration values for the parameters for the Demo Recording Utility, such as dump path and proxy path.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a computing system in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function. Alternatively, this may include user touch or gesture interfaces with a tablet, smart phone or other video enabled system.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A system, comprising:
    a data storage system; and
    a processor and program logic stored in memory and executed by the processor, the program logic including:
        a management console, comprising interface logic configured to provide a user interface, and to receive a request to record a demo of a Web application via the user interface; and
        a recording utility, comprising recording logic configured to, responsive to detecting an interaction of a user with the Web application during a predetermined time period defined by time-out settings of a demo recording proxy server, capture, by the demo recording proxy server, from at least one intercepted data stream from a user browser to the Web application, a first instance of underlying code and assets utilized to render the Web application to the user via the user browser, comprising capturing interactive components of the Web application that are not specified in the request so that a set of captured interactive components have the same functionality and interactive features in the demo as in the Web application, wherein the underlying code and assets comprise both client-side code and assets captured regardless of whether any related underlying code and assets of the Web application are interacted with by the user and server-side code and assets,
        data consolidation and storage logic configured to save the first instance of the underlying code and assets to a database, and
        demo editing logic configured to create the demo of the Web application incorporating the first instance of the underlying code and assets, wherein the underlying code and assets are executable via the demo and retain the functionality and interactive features of the Web application.

2. The system of claim 1, wherein the recording logic is further configured to, upon the user interacting with the Web application, capture a second instance of the underlying code and assets utilized to render the Web application, and wherein the demo of the Web application further incorporates the second instance of the underlying code and assets.

3. The system of claim 1, wherein the assets utilized to render the Web application include a JavaScript library.

4. The system of claim 1, wherein the Web application is a rich Internet application that operates using client-side code that bypasses a Webserver.

5. The system of claim 1, wherein the demo is operational without requiring Internet connectivity.

6. The system of claim 1, wherein the user interface is configured to be accessed by the user through the user browser.

7. The system of claim 1, wherein the demo editing logic further comprises link management logic configured to identify link paths within captured requests and responses of the user, and to convert the link paths so as to be structured relative to the first instance of the underlying code and assets.

8. The system of claim 1, wherein the demo editing logic further comprises data management logic configured to:
    receive at least one target data set parameter;
    identify a first data set within the demo, the first data set having the at least one target data set parameter; and
    edit the demo so as to replace the first data set with a second data set different from the first data set.

9. The system of claim 8, wherein the at least one target data set parameter includes a particular format of a grouping of characters.

10. The system of claim 8, wherein the demo is a first demo, and wherein the data management logic is further configured to:
    identify a third data set within a second demo, the third data set having the at least one target data set parameter; and
    edit the second demo so as to replace the third data set with the second data set, the second data sets being different from the third data set.

11. The system of claim 8, wherein the second data set includes predetermined test data.

12. The system of claim 9, wherein the second data set includes predetermined test data.

13. A demo recording utility comprising a processor coupled to non-transitory machine readable storage media having instructions stored therein that, when executed by the processor, cause the processor to:

responsive to detecting an interaction of a user with a Web application during a predetermined time period defined by time-out settings of a demo recording proxy server, capture, by the demo recording proxy server, from at least one intercepted data stream from a user browser to the Web application, a first instance of underlying code and assets utilized to render the Web application to the user via the user browser, the underlying code and assets comprising both client-side code and assets and Web application server-side responses and interactive components captured regardless of whether any related underlying code and assets of the Web application are interacted with by the user;

save the first instance to a database; and create a demo of the Web application incorporating the first instance, wherein the underlying code and assets are executable via the demo and retain functionality and interactive features of the Web application.

14. The demo recording utility of claim 13, wherein the instructions further cause the processor to, upon the user interacting with the Web application, capture a second instance of the underlying code and assets utilized to render the Web application.

15. The demo recording utility of claim 13, wherein the assets utilized to render the Web application include a JavaScript library.

16. The demo recording utility of claim 13, wherein the Web application is a rich Internet application that operates using client-side code that bypasses a Webserver.

17. The demo recording utility of claim 13, wherein the demo is operational without requiring Internet connectivity.

18. The demo recording utility of claim 13, wherein the instructions further cause the processor to identify link paths within captured user requests and responses, and to convert the link paths so as to be structured relative to the first instance of the underlying code and assets.

19. The demo recording utility of claim 13, wherein the instructions further cause the processor to:

receive at least one target data set parameter;

identify a first data set within the demo, the first data sets having the at least one target data set parameter; and edit the demo so as to replace the first data set with a second data set different from the first data set.

20. The demo recording utility of claim 19, wherein the at least one target data set parameter includes a particular format of a grouping of characters.

21. The demo recording utility of claim 19, wherein the demo is a first demo, and wherein the instructions further cause the processor to:

identify a third data set within a second demo, the third data set having the at least one target data set parameter; and edit the second demo so as to replace the third data set with the second data set, the second data set being different from the third data set.

22. The demo recording utility of claim 19, wherein the second data set includes predetermined test data.

23. The demo recording utility of claim 13, wherein the instructions further cause the processor to apply annotations to the demo based on an input from the user.

24. The system of claim 1, wherein access credentials of the user are verified prior to capturing the first instance of underlying code and assets utilized to render the Web application.

25. The system of claim 24, wherein the access credentials of the user are verified by cross-referencing user information from an LDAP directory.

26. The system of claim 24, wherein the access credentials of the user are verified using a single sign-on framework.

27. The system of claim 25, wherein the access credentials of the user are verified by cross-referencing user information from an LDAP directory.

28. The system of claim 27, wherein the recording logic is structured to detect a browser close event during the user session.

29. The system of claim 1, wherein the recording logic is structured to invalidate a user session and a set of recorded data responsive to detecting a user session anomaly.

30. The system of claim 29, wherein the recording logic is structured to detect a browser close event during the user session.

* * * * *